United States Patent [19]

Kimura

[11] Patent Number: 5,579,038
[45] Date of Patent: Nov. 26, 1996

[54] RECORDING APPARATUS AND INK EMPLOYING BIODEGRADABLE SUBSTANCE

[75] Inventor: Isao Kimura, Kawasaki, Japan

[73] Assignee: Canon Kabushiki Kaisha, Tokyo, Japan

[21] Appl. No.: 203,366

[22] Filed: Mar. 1, 1994

[30] Foreign Application Priority Data

Mar. 2, 1993 [JP] Japan ................................. 5-041374
May 21, 1993 [JP] Japan ................................. 5-119850

[51] Int. Cl.$^6$ ................................ B41J 2/17; B41J 2/185
[52] U.S. Cl. ................................................................ 347/36
[58] Field of Search ................................................. 347/36

[56] References Cited

U.S. PATENT DOCUMENTS

| | | | |
|---|---|---|---|
| 4,076,663 | 2/1978 | Masuda et al. | 260/17.4 GC |
| 4,524,365 | 6/1995 | Kakeno et al. | 346/75 |
| 5,223,028 | 6/1993 | Aulick et al. | 106/20 H |

FOREIGN PATENT DOCUMENTS

| | | | |
|---|---|---|---|
| 0364284A2 | 4/1990 | European Pat. Off. | |
| 0442528A2 | 8/1991 | European Pat. Off. | |
| 0490545A2 | 6/1992 | European Pat. Off. | 347/86 |
| 0528644A1 | 2/1993 | European Pat. Off. | |
| 0527271A1 | 2/1993 | European Pat. Off. | |

OTHER PUBLICATIONS

Derwent Abstract (WPI) No. 92–247298 with respect to Japanese Patent Document No. 4–168150 (Jun. 16, 1992).
Derwent Abstract (WPI) No. 93–003926 with respect to Japanese Patent Document No. 4–331272 (Nov. 19, 1992).
Patent Abstracts of Japan vol. 12, No. 242 (C–510) with respect to Japanese Patent Document No. 63–033484 (Feb. 13, 1988).
Derwent Abstract (WPI) 88–080821 with respect to Japanese Patent Document No. 63–033484 (Feb. 13, 1988).

*Primary Examiner*—Valerie A. Lund
*Attorney, Agent, or Firm*—Fitzpatrick, Cella, Harper & Scinto

[57] ABSTRACT

A waste-ink absorbent to be mounted on an ink-jet recording apparatus comprises a composition containing a biodegradable polymer and a microorganism growth nutrient. An ink contains a recording agent and a liquid medium for dissolving or dispersing the recording agent, the recording agent comprising a composition containing a biodegradable polymer linked to a solubilizing group of a water-soluble dye by coordination bonding. An ink-jet recording method conducts recording by ejecting droplets of the ink through an ejection orifice of a recording head in correspondence with recording signals. An ink-jet recording apparatus is equipped with a recording unit having an ink container holding the ink therein and a head.

13 Claims, 5 Drawing Sheets

RECORDING APPARATUS AND INK EMPLOYING BIODEGRADABLE SUBSTANCE

BACKGROUND OF THE INVENTION

1. Field of the Invention

The present invention relates to a recording apparatus which intends to prevent environmental pollution, particularly to a biodegradable waste-ink absorbent of the environment protection type which will not cause environmental pollution, and is effective in absorbing a waste aqueous dye-containing ink in ink-jet recording apparatus such as printers, copying machines, and plotters for recording letters and images.

The present invention also relates to an ink-jet recording apparatus employing the above waste-ink absorbent.

The present invention further relates to an ink which will not cause environmental pollution and is useful for writing tools such as felt-tip pens, ball-point pens, and line-markers; printers for recording letters and images, copying machines, facsimile machines, plotters, and particularly ink-jet recording apparatus.

The present invention further relates to an apparatus employing the above ink.

2. Related Background Art

Hitherto, in ink-jet recording and related technical fields employing an aqueous dye-containing ink, improvement of weatherability of the ink such as lightfastness, water resistance, and ozone resistance have been studied to prevent natural deterioration of inks. Therefore, various efforts have been made to improve weatherability of the dye itself for the ink, namely the coloring matter of the ink.

For example, the number of solubilizing groups (e.g., —OH, —SO$_3$, —COOH, etc.) in a dye molecule is decreased to raise water fastness of the dye. Such dyes are stable in a relatively high pH range because of their lower water-solubility, but tend to deposit at a pH of environmental water (pH=5.8 to 8.6). Accordingly, the dye, if discharged to the environment, is liable to deposit and accumulate in the soil, or bottoms of rivers, lakes or seas and color the ecosystem therein.

On the other hand, with increasing volumes of color image recording in recent years, high color-developing inks are coming to be consumed in a larger quantity. The consumption of water-based color inks is increasing year by year particularly in ink-jet recording and in general writing. Especially, high color-developing dyes, which give high quality recorded images, are expected to be used to a greater extent. Ideally, the aforementioned aqueous ink charged in the recording apparatus is to be used only for recording. Practically, however, not all of ink is consumed entirely by the recording, but the ink is partly recovered by a built-in mechanism called a recovery system to secure the reliability of the recording apparatus.

This recovery system serves at the start of recording to suck out a part of ink from the recording head and replace it with fresh ink to facilitate the start of recording after a long term of standing of the recording head. The ink sucked out by this step is sent through a waste ink transfer path and stored as a waste ink in a container having an ink absorbent. The absorbent which have absorbed the waste ink to its full capacity is discarded or burnt, by itself or together with the container. With increased use of the ink-jet recording system, the amount of the discarded waste-ink absorbent and the discarded container thereof is expected to further increase.

Few of the color-recorded materials prepared with the aforementioned color ink are preserved for a long term, but most of them typically are used only for temporary purposes. In other words, most of the recorded matters are discarded into the environment. The water-based color ink which has been discharged into the environment rarely deposits in the soil or on the bottom of bodies of water. The ink discharged onto the soil will cause coloring and contamination of underground water. The ink discharged into waters also will cause coloring and contamination which decreases light transmittance of the waters and destroys the fishery ecosystem by causing water-bloom growth.

SUMMARY OF THE INVENTION

The present invention intends to provide a biodegradable ink absorbent, and is effective in environmental protection to meet the increasing amount of the discarded waste-ink absorbent which may be thrown away into the environment.

The present invention also intends to provide an ink-jet recording apparatus which employs the above ink absorbent.

The present invention further intends to provide an ink containing a biodegradable dye which will be degraded by microorganisms into safe substances with decolorization, and has excellent recording properties and high water fastness.

The present invention still further intends to provide an ink-Jet recording method, and an ink-jet recording apparatus employing the above ink.

According to an aspect of the present invention, there is provided a waste-ink absorbent to be mounted on an ink-jet recording apparatus, comprising a composition containing a biodegradable polymer and a microorganism growth nutrient.

According to another aspect of the present invention, there is provided an ink-jet recording apparatus equipped with a waste-ink absorbent, wherein the waste-ink absorbent is comprised of a composition containing a biodegradable polymer and a microorganism growth nutrient.

According to still another aspect of the present invention, there is provided an ink containing a recording agent and a liquid medium for dissolving or dispersing the recording agent, the recording agent comprising a composition containing a biodegradable polymer linked to a solubilizing group of a water-soluble dye by coordination bonding. The biodegradable polymer in the ink may be an organic acid salt of cationic chitosan or cationic starch. Further, the biodegradable polymer may be contained in an amount of from 1 to 30% by weight based on the water-soluble dye.

According to a further aspect of the present invention, there is provided an ink-jet recording method which conducts recording by ejecting droplets of an ink containing a recording agent and a liquid medium for dissolving or dispersing the recording agent through an ejection orifice of a recording head in correspondence with recording signals, the recording agent comprising a composition containing a biodegradable polymer linked to a solubilizing group of a water-soluble dye by coordination bonding.

According to a further aspect of the present invention, there is provided a recording unit equipped with an ink container holding an ink therein and a head for ejecting droplets of the above-mentioned ink.

According to a further aspect of the present invention, there is provided an ink cartridge equipped with an ink container holding the above-mentioned ink.

According to a further aspect of the present invention, there is provided an ink-Jet recording apparatus equipped with a recording unit having an ink container holding an ink therein and a head for ejecting droplets of the above-mentioned ink.

According to a further aspect of the present invention, there is provided an ink-jet recording apparatus equipped with a head for ejecting an ink as droplets, an ink cartridge having an ink container holding the ink therein, and an ink supplying device for supplying the above-mentioned ink from the ink cartridge to the head.

DETAILED DESCRIPTION OF THE PREFERRED EMBODIMENTS

The ink-jet recording apparatus of the present invention is characterized by the ink absorbent which comprises a composition containing a biodegradable polymer and a microorganism growth nutrient. The present invention is further characterized in that not only the biodegradable substance is utilized by itself but also the biodegradation is intentionally made to proceed advantageously from the start of the use of the ink absorbent in consideration of the long period, several months to several years, required for the biodegradation.

In other words, the ink absorbent of the present invention is especially characterized in that the absorbent and the ink absorbed thereto begin to decompose due to growth of microorganisms at the time when they are used in the apparatus.

Furthermore, the present invention is also characterized by an ink-absorbent container which is constructed from a plastic material containing a minimum amount of an antimicrobial agent to prevent decomposition and collapse of the waste ink absorbent during the time when the absorbent is mounted on the apparatus and the function of the apparatus is utilized.

The present invention provides an ink which contains a recording agent and a liquid medium for dissolving or dispersing the agent, the recording agent comprising a composition having a biodegradable polymer linked by coordination bonding with a solubilizing group of the water-soluble dye, and provides also an ink-jet recording method, and an apparatus employing the ink.

The waste-ink absorbent employing a biodegradable polymer, which is a first embodiment of the present invention, is described first.

The biodegradable polymer employed in the present invention, which will decompose in a light-intercepting ink absorbent container, is suitably a biodegradable synthetic polymer. The effective biodegradable synthetic polymer includes:

(1) starch-compounded polymers,
(2) modified starch-compounded polymers,
(3) micronized cellulose-compounded polymers, and
(4) microorganism-produced synthetic polymers. In some cases, polymers mentioned below may be used although they are somewhat less biodegradable:
(5) polycaprolactone-compounded polymers, and
(6) PEG, PVA, polyurethanes, and polyesters.

The antimicrobial agent to be incorporated in the container of the waste-ink absorbent is suitably a usual mildew-proofing agent for plastics, specifically including preventole (N-fluorodichloromethylthiophthalimide), thiabendazole, Na-omadine, dioxin, and so forth.

The microorganism-growth nutrient to be mixed with the biodegradable polymer is required to become useful as a nutrient for the microorganism only when it is brought into contact with water which is a main constituent of the ink. The suitable microorganism-growth nutrient includes powdery solid foodstuffs, starch, sugars, and the like. Such a powdery matter is incorporated into the aforementioned absorbent constituted of a biodegradable polymer to cause growth of microorganisms.

No evaluation method is clearly defined for the biodegradability of the ink absorbent having the above constitution. One example of applicable evaluation methods therefor is a method shown in ASTM G21-70. In this evaluation method, the growth degree of microorganism (mildew) is rated on grades by comparison with a polystyrene resin and a polyethylene resin as reference samples. In this evaluation, the growth degrees on the reference resins (polystyrene and polyethylene) correspond to the first grades and the second grades, and the growth degree on the test sample which is defined to have biodegradability corresponds to the third or fourth grade.

Another method of reflecting generally the biodegradability in a natural environment in a broad sense is the microorganism-degradation test (so-called MITI test) of various chemical substances based on "Law Concerning the Examination and Regulation of Manufacture, etc. of Chemical Substances" enforced in Japan in 1974. In the MITI test, activated sludge is employed which participates in natural cleaning. For the intention of the present invention, it is considered suitable to apply the evaluation method of the above ASTM G21-70 test.

From the standpoint of environmental pollution prevention, not only the ink absorbent, but also other parts including the outer case of the recording apparatus, the ink container, and other material, which have previously been constructed from a non-rotting substance, are desirably constructed from a biodegradable or photodegradable material as far as possible.

Figure 1:
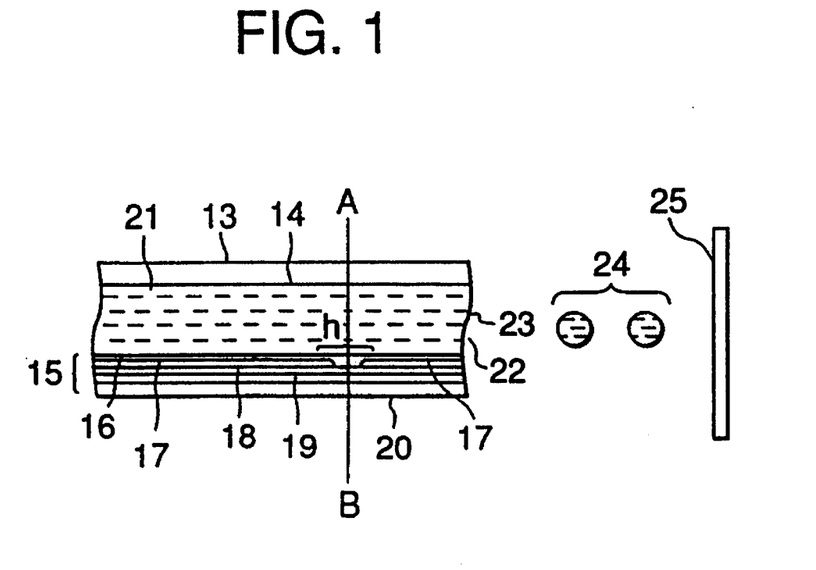
FIG. 1 is a sectional view of an ink-jet recording head along an ink flow path direction.
Figure 2:
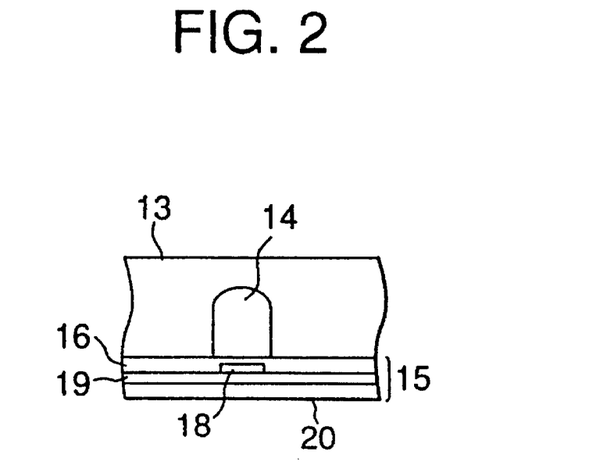
FIG. 2 is a front view of the ink-jet recording head at The cross-section A-B.

In an example of an ink-jet recording apparatus employing the aqueous ink of the present invention, thermal energy is applied to the ink, and droplets of the ink are ejected by bubbling caused by the thermal energy to conduct recording. An ink-jet recording head which is a main part of the apparatus has a construction, for example, as shown in FIG. 1 and FIG. 2. FIG. 1 is a sectional view of the ink-jet recording head along an ink flow path direction. FIG. 2 is a front view of the head.

In FIG. 1, the head 13 is constructed by bonding a plate of glass, ceramics, or plastics having grooves 14 for ink flow 21 with a head base plate 15 having a heat-generating portion. The base plate 15 of the heat-generating head is constituted of a protection layer 16 formed of silicon oxide or the like, electrodes 17 made of aluminum or the like, a heat-generating resistance layer 18 made of hafnium boride or the like, a heat accumulating layer 19 made of silicon oxide or the like, and substrate plate 20 made of alumina or the like.

On application of an electric signal to the electrodes 17 of the head, the region denoted by a symbol "h" on the head base plate 15, namely the heater region, generates heat abruptly to form bubbles in the ink 23 in contact with the heater region, and ink droplets 24 are ejected from an ejection nozzle 22 by the pressure of the bubbles. The ink droplets ejected from the head are projected toward a recording medium 25 to form a recorded image. The ink-jet recording head 13 may have a plurality of ejection nozzles 22 in correspondence with the intended recording density.

Figure 3:
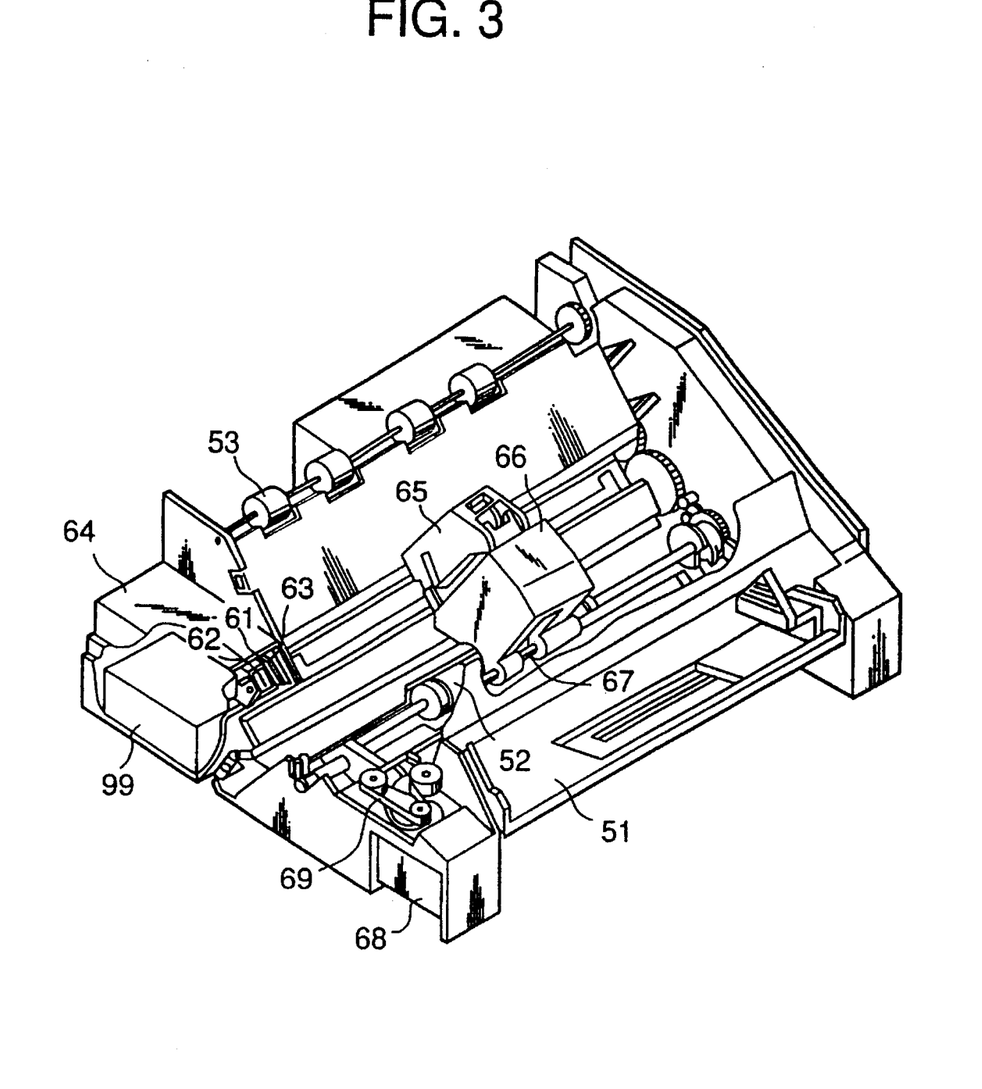
FIG. 3 is a perspective view of an example of an entire ink-Jet recording apparatus.

FIG. 3 illustrates an example of the ink-jet recording apparatus having such a head mounted thereon. In FIG. 3, a blade 61 as a wiping member is held at one end by a blade-holding member, forming a fixed end in the shape of a cantilever. The blade 61 is placed at a position adjacent to the recording region of the recording head, and is constituted such that it moves in the direction perpendicular to the direction of movement of the recording head to come into contact with the ejection nozzle face to cap the nozzles.

An ink absorbent 63 is placed at a position adjacent to the blade 61, and is held so as to protrude into the path of motion of the recording head in a manner similar to that of the blade 61. The ink absorbent 63 is connected through a tube or the like to a waste-ink absorbent 99. The blade 61, the cap 62, and the absorbent 63 serve to remove water, dust, and the like from the face of the ink ejection nozzle.

A recording head 65 has an energy-generating means for the ejection, and conducts recording by ejecting the ink onto a recording medium opposite to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the region adjacent thereto. A paper delivery portion 51 for delivery of a recording medium and a paper delivery roller 52 driven by a motor (not shown in the drawing) delivers a recording medium to the position opposite to the ejection nozzle face of the recording head, and the recording medium is delivered with the progress of the recording to a paper discharge portion provided with paper-discharging rollers 53.

In the above constitution, when the recording head 65 returns to the home position on completion of recording, the cap 62 of the head-recovery portion 64 is positioned out of the path of movement of the recording head 65, and the blade 61 is allowed to protrude into the path of movement. Thereby, the ejection nozzle face of the recording head 65 is wiped. To cap the ejection face of the recording head 65, the cap 62 protrudes toward the path of movement of the recording head to come into contact with the ejection nozzle face.

When the recording head 65 is made to move from the home position to the record-starting position, the cap 62 and the blade 61 are at the same position as in the above-mentioned wiping step, so that the ejection nozzle face of the recording head is wiped also in this movement. The recording head is moved to the home position not only at the end of the recording and at the time of ejection recovery, but also at predetermined intervals during recording in the recording region. The nozzle is wiped by such movement.

Figure 4:
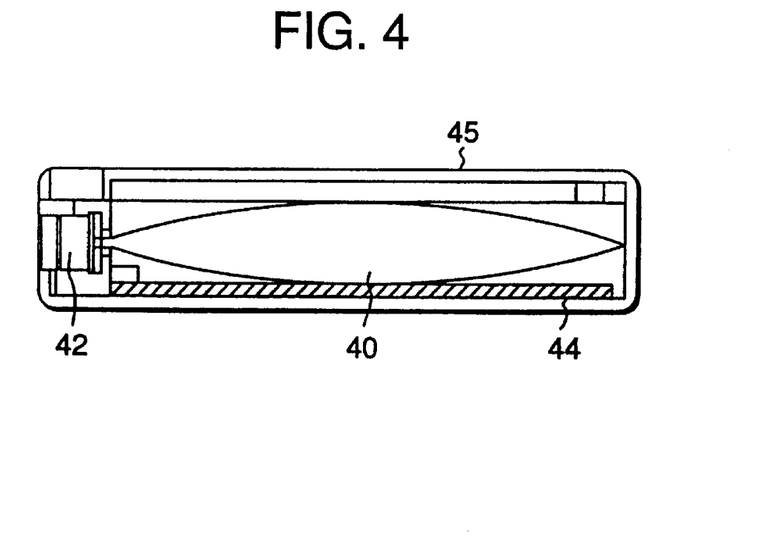
FIG. 4 is a cross-sectional view of an example of an ink cartridge.

FIG. 4 is a sectional view of an example of the ink cartridge 45 which holds an ink to be supplied through an ink supplying member such as a tube. The ink container portion 40, for example an ink bag, contains an ink to be supplied, and has a rubber plug 42 at the tip. Insertion of a needle (not shown in the drawing) into the plug 42 enables supply of the ink from the ink bag. A waste ink absorbent 44 serves to absorb a waste ink. The liquid-contacting surface of the ink container portion is preferably made of polyolefin, particularly preferably made of polyethylene.

Figure 5:
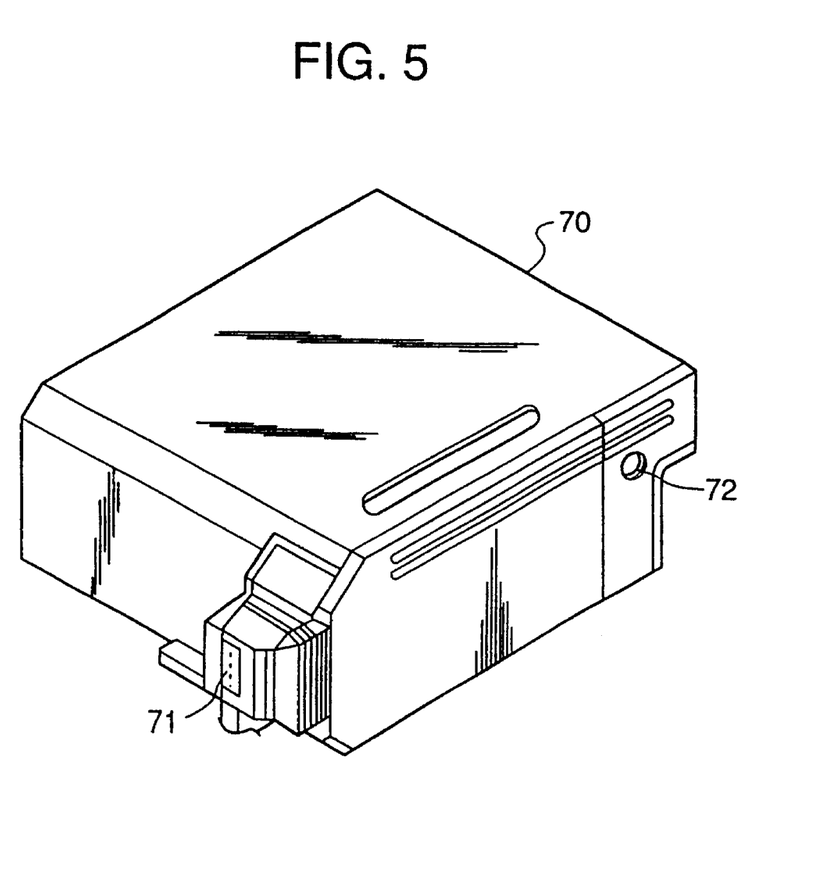
FIG. 5 is a perspective view of an integral construction of an ink-jet recording head and an ink cartridge.

The ink-jet recording apparatus used in the present invention is not limited to the above-mentioned one which has a head separate from an ink cartridge. Integration thereof as shown in FIG. 5 may suitably be employed. In FIG. 5, a recording unit 70 houses an ink container portion including as an ink absorbent, and the ink in the absorbent is ejected from a head 71 having a plurality of orifices. An air-communication opening 72 is provided to communicate the interior of the cartridge with the open air. The recording unit 70 may be used in place of the recording head shown in FIG. 3, and is made to be readily mountable to and demountable from the carriage 66. The ink containing a biodegradable polymer, which is a second embodiment of the present invention, is described below.

The ink of the present invention comprises a composition containing a biodegradable polymer linked to a water-soluble dye at the solubilizing group of the dye by coordination bonding.

The water-soluble dye generally has a structure in which two or more naphthalene rings or benzene rings are linked through an azo group or azo groups, and a hydroxy group, an amino group, a sulfo group, or the like is linked thereto, for example, as shown below.

In the above structure, the sulfo group —$SO_3$ is the solubilizing group, which dissociates in an aqueous solution to form a sulfonium anion, and to this sulfo group a cation site of a biodegradable polymer links by coordination bonding.

For example, chitosan acetate, a kind of organic acid salt of a biodegradable chitosan (shown by the formula (a) below), has a cationic group, namely an amino group combined with acetic acid, and comes to be bonded by coordination to a sulfo group of a dye molecule (as shown by the formula (b) below):

(a)

R—SO₃⁻: Dye molecule

The degradation is considered to proceed as below. When the ligand in the formula (b) is brought into contact with the natural environment, the biodegradable chitosan portion is first degraded by bacteria to come to an active state. Simultaneously, the coordinating dye skeleton is affected by the active decomposition intermediate of the chitosan to be cleaved at the azo Group at an accelerated rate. Thereby, the dye is decolored and the dye fragment having a shortened molecular chain is enclosed by the chitosan decomposition intermediate having a much longer molecular chain length than the dye fragment. Finally, the dye fragment is metabolized by bacteria together with the chitosan.

The dye used in the present invention suitably includes phthalocyanine dyes, xanthene dyes, anthraquinone dyes, monoazo dyes, disazo dyes, trisazo dyes, tetrazo dyes, and the like, which are conventionally used in ink-jet apparatuses and writing tools. In particular, as a black dye, preferred are the dye examples No. 7 to No. 6 having structures shown below. The dye is preferably incorporated into the ink at a content of 0.5% to 20% by weight, and for ink jet recording at a content of 0.5% to 10% by weight of the total weight of the ink.

(Dye Examples)

The biodegradable polymer to be bonded to the dye by coordination bonding includes organic acid salts of cationic chitosans such as chitosan acetate, cationic starch, vinylbenzyl type cationic polymers, acrylic acid type cationic polymers, polyamine-sulfone, polyarylamines, and the like. Of these, particularly preferred are acetic acid salts of chitosans and cationic starch. The amount of the biodegradable to be used is determined depending on the number of solubilizing groups in the dye molecule, the coordination ratio of the polymer to the dye molecule, and the structural unit number of the polymer. The amount of the polymer is preferably in the range of from 1 to 30% by weight, more preferably from 5 to 10% by weight of the dye. A larger amount of the polymer than the above is not desirable because it tends to cause deposition of the dye. A smaller amount of the polymer is also not desirable because biodegradability is not completely achievable.

The ink of the present invention may contain a humectant and a solubilizing aid shown below for improving the properties as an ink. The additives include alkylene glycols such as ethylene glycol, diethylene glycol, triethylene glycol, 1,2,6-hexanetrial, and propylene glycol; polyalkylene glycols such as polyethylene glycol, and polypropylene glycol: alcoholamines such as monoethanolamine, diethanolamine, and triethanolamine; aprotic polar solvents such as dimethylformamide, dimethylsulfoxide, and sulfolane; lower alkyl ethers of polyhydric alcohols such as ethylene glycol monomethyl ether, and diethylene glycol monomethyl ether; glycerol, 2-pyrrolidone, N-methylpyrrolidone, sorbitol, urea, and so forth. Such additives are used preferably in an amount of from 2 to 60% by weight of the entire ink.

For use in ink-jet recording, the ink of the present invention is further improved in ink droplet ejection by addition of an alkyl alcohol to the ink in the present invention.

Furthermore, from the standpoint of environmental pollution prevention, not only the ink, but also other parts including the ink container, the outer case of the recording apparatus, and other material which have been previously constructed from a non-rotting substance are desirably constructed from a biodegradable or photodegradable material as far as possible.

The ink of the present invention is useful for writing tools such as felt-tip pens, ball-point pens, and line-markers; printers for recording letters and images, copying machines, facsimile machines, and plotters. In particular, the ink is useful for ink-jet recording, especially ink-jet recording of the type which ejects ink by bubbling of the ink by thermal energy as mentioned before.

The present invention is described specifically by reference to Examples without limiting the invention in any way.

EXAMPLE 1

A film of Matarbee AF-10H (trade name, biodegradable polymer manufactured by The Nippon Synthetic Chemical Industry Co., Ltd.) was cut into fiber. 90 parts of the fiber and 10 parts of starch manufactured by Wako Pure Chemical Industries, Ltd. as a microorganism growth nutrient were mixed, and pressed into a sheet at a pressure of 100 kg/cm². This sheet, as the waste-ink absorbent 44, was placed in an ink cartridge 45 in a shape shown in FIG. 4. The ink cartridge 45 was made of polypropylene containing 0.01 part of preventole A3 (made by Bayer Japan, Ltd.) as an antifungus agent. The ink used was aqueous black ink having the composition given below. Letter printing was conducted on A4-size paper sheets, 50 sheets per day on average.

(Ink Composition)

| Dye: | C.I. Food Black 2 | 3% by weight |
|---|---|---|
| Solvent: | 1,2-propanediol | 30% by weight |
| Water: | | 67% by weight |

Figure 6:
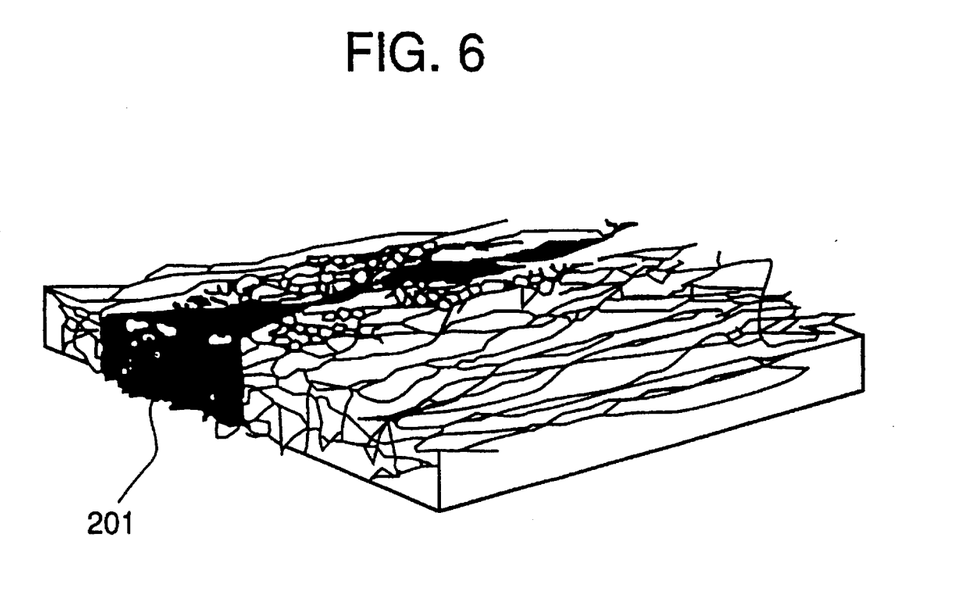
FIG. 6 illustrates schematically the state of biodegradation of a specimen of a waste ink absorbent.

After 3 months, the ink cartridge was disassembled, and the waste-ink absorbent was examined. As the result, growth of mildew 201 was observed on the border between the ink-bearing portion and the non-ink-bearing portion as shown in FIG. 6. Additionally, the waste-ink absorbent itself was observed to have deteriorated remarkably in strength, whereby the progress of biodegradation of the absorbent was confirmed. On the other hand, the ink cartridge 45 was not deformed, not decolored, and not deteriorated in strength. In the system of this apparatus, the ink container portion (an ink bag) 40 holds the ink in an amount sufficient for letter printing of 1000 sheets of A4-size paper sheets. When the ink therein has entirely been consumed, the empty ink bag is replaced with new one. The waste ink absorbent has a sufficient absorption capacity for use for 3 years which is the life of the main body of the apparatus.

EXAMPLE 2

Biopol homopolymer (trade name, biodegradable polymer manufactured by ICI, HV: 10%) was cut into fiber in the same manner as in Example 1. 90 parts of the fiber and 10 parts of powdery Maggie bouillon as a microorganism growth nutrient were mixed, and formed into a sheet. This sheet, as the waste-ink absorbent 44, was placed in an ink cartridge 45 in a shape shown in FIG. 4. The ink used was the same one as in Example 1. After repetition of printing for 3 months, the waste-ink absorbent was examined, and it was confirmed that growth of mildew had proceeded similarly as in Example 1 to cause partial breakage of the fiber sheet.

EXAMPLE 3

A waste-ink absorbent was prepared by mixing 50 g of chitosan (first-grade reagent, manufactured by Wako Pure Chemical Industries, Ltd.) as the biodegradable polymer, 10 g of polyvinyl alcohol (polymerization degree: 2000, manufactured by Wako Pure Chemical Industries, Ltd.), further mixing therewith 5 g of D-fructose as the microorganism growth nutrient, and molding the resulting powdery matter. The waste-ink absorbent was used in an ink-jet recording apparatus as shown in FIGS. 3 and 4, and the ink was the same as the one used in Example 1. After 3 months, the waste-ink absorbent was examined, and it was found that mildew had grown therein and the absorbent had partially undergone fermentation.

EXAMPLE 4

A waste-ink absorbent in a form shown in FIG. 4 was prepared by mixing 80 parts of Matarbee used in Example 1 as the biodegradable polymer, and 20 parts of powder of dried rice (Koshihikari) as the microorganism growth nutrient, and shaping the resulting powdery matter into a sheet. With an aqueous ink having the composition below, letter printing tests were repeated.

(Ink Composition)

| Dye: | C.I. Direct Black 19 | 3% by weight |
|---|---|---|
| Solvent: | Glycerol | 20% by weight |

| | |
|---|---|
| 2-propanol: | 7% by weight |
| Water: | 70% by weight |

After 3 months, the waste-ink absorbent was examined, and it was found that blue mold and red mold were growing over the whole surface of the absorbent and the strength of the absorbent had decreased.

As shown in Examples 1 to 4, it is obvious that the waste-ink absorbent of the present invention, which is formed from a composition containing a biodegradable polymer and a microorganism growth nutrient, undergoes significant biodegradation by use for as little as 3 months. Such a waste-ink absorbent will cause no waste pollution since it will be degraded by microorganisms even if it is discharged in the natural environment, and contributes to the solution of future environmental protection problems.

EXAMPLES 5 to 9, and REFERENCE EXAMPLES 1 to 2

Chitosan acetate was prepared by dissolving chitosan (manufactured by Taiyo Kagaku K.K.) in aqueous 5% acetic acid solution and heating without boiling. Organic acids other than acetic acid such as succinic acid, lactic acid, and malic acid can be used in the same manner.

Corn starch (manufactured by Wako Pure Chemical Industries, Ltd.) was dispersed in diethylaminoethyl chloride, aqueous sodium hydroxide solution, and aqueous sodium sulfate solution, and heated at 50° C. for 4 hours to prepare cationic starch.

The components shown below were mixed, and the mixture was filtered by means of a membrane filter under pressure to prepare inks of Examples 5 to 9 and Reference Examples 1 to 2.

EXAMPLE 5

| | |
|---|---|
| C.I. Acid Blue 9 | 3% by weight |
| Diethylene glycol | 15% by weight |
| Chitosan acetate | 2% by weight |
| Ethanol | 10% by weight |
| Water | 70% by weight |

EXAMPLE 6

| | |
|---|---|
| C.I. Acid Blue 9 | 3% by weight |
| 2-Pyrrolidone | 8% by weight |
| Chitosan acetate | 1% by weight |
| 2-propanol | 10% by weight |
| Water | 79% by weight |

EXAMPLE 7

| | |
|---|---|
| Dye Example No. 1 | 2% by weight |
| Glycerol | 8% by weight |
| Chitosan acetate | 0.5% by weight |
| Water | 89.5% by weight |

EXAMPLE 8

| | |
|---|---|
| Dye Example No. 6 | 3% by weight |
| Cationic starch | 0.5% by weight |
| Triethanolamine | 0.5% by weight |
| Propylene glycol | 20% by weight |
| Water | 76% by weight |

EXAMPLE 9

| | |
|---|---|
| C.I. Acid Blue 9 | 2% by weight |
| Cationic starch | 1% by weight |
| N-Methyl-2-pyrrolidone | 30% by weight |
| Water | 67% by weight |

REFERENCE EXAMPLE 1

| | |
|---|---|
| C.I. Acid Blue 9 | 3% by weight |
| 2-Pyrrolidone | 8% by weight |
| 2-Propanol | 10% by weight |
| Water | 80% by weight |

REFERENCE EXAMPLE 2

| | |
|---|---|
| Dye Example No. 6 | 3% by weight |
| Triethanolamine | 0.5% by weight |
| Propylene glycol | 20% by weight |
| Water | 76.5% by weight |

The above 7 inks of Examples and Reference Examples were subjected to a biodegradation test.

Figure 7:
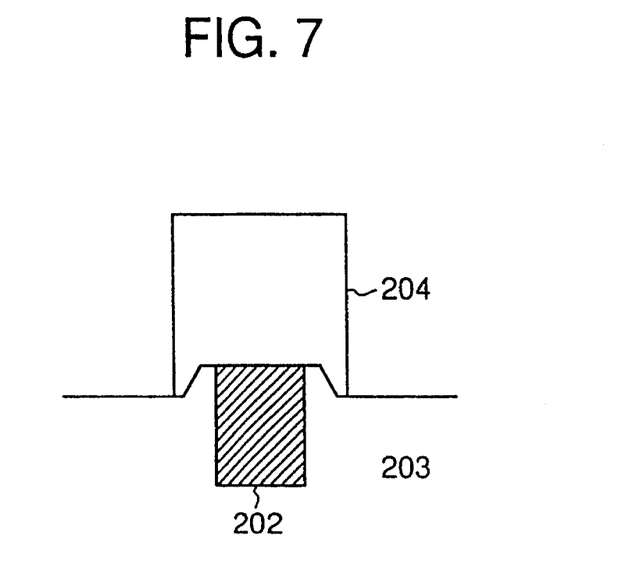
FIG. 7 illustrates schematically the test method in Examples 5 to 9 of the present invention and Reference Examples 1 to 2.

Farm soil was placed in a 2-liter beaker 202 as shown in FIG. 7. 200 ml of the test ink was added thereto. The beaker with the soil was returned to the farm from which the soil 203 had been collected, and was buried as shown in FIG. 7. The beaker was covered with a steel can 204 for shading, which had air holes at the lower portion. Soil, samples were taken out in an amount of 100 ml once a week. The sample was washed with water to extract the ink component, and the extract was concentrated to obtain the same dye concentration as that at the beginning of the test. The light absorbance of the aqueous solution was measured by means of UV-visible spectrophotometer L-4200 made by Hitachi, Ltd.

Figure 8:
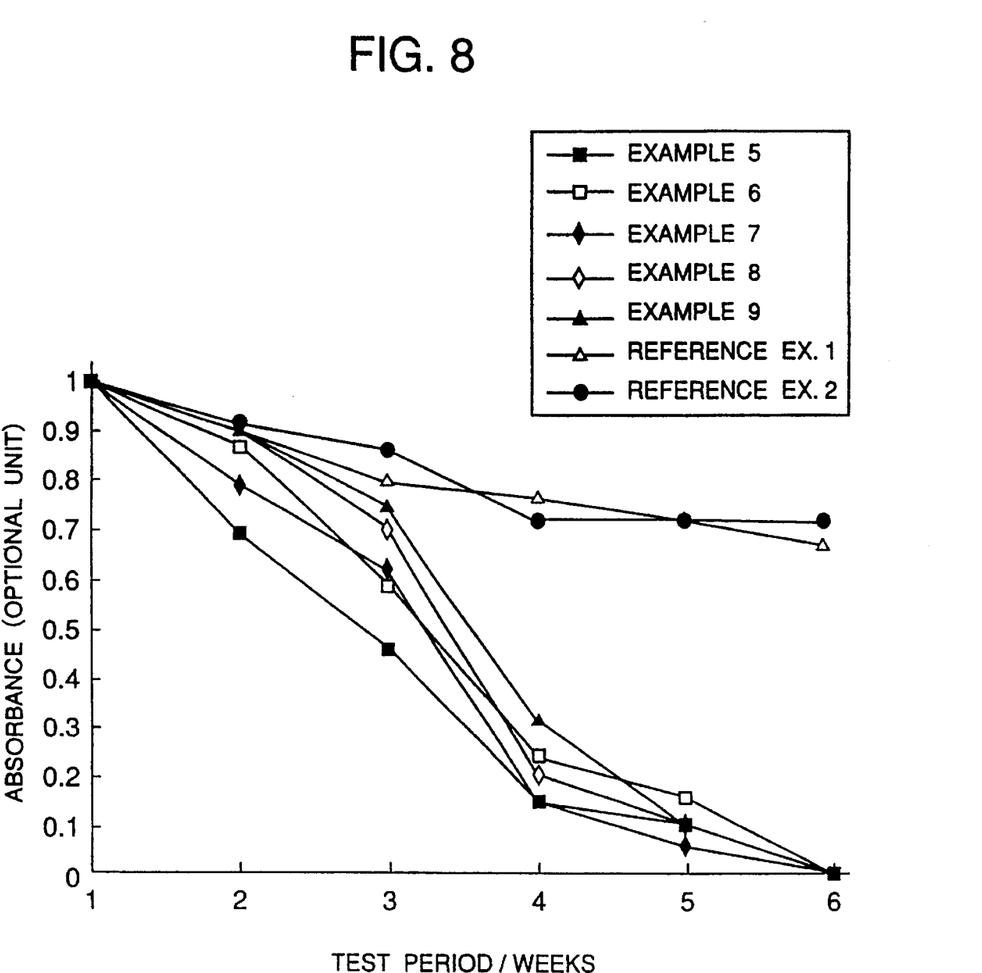
FIG. 8 is a graph showing the evaluation results in Examples 5 to 9 of the present invention and Reference Examples 1 to 2.

FIG. 8 shows the changes of the absorbance during the test period. Although the absorption wavelength shifts to the lower wavelength side with the progress of the degradation of the dye, the change of the absorbance was followed at the initial absorption wavelength in this experiment. As understood from FIG. 8, any of the inks of the present invention was decolored in 2 to 3 weeks owing to degradation of the dye. On the contrary, the inks of Reference Examples were found not to be completely decolored even though a small decrease of the absorbance was observed.

The recording properties of the respective inks of Examples 5 to 9 of the present invention and of Reference Examples 1 and 2 were evaluated as described below.

An ink cartridge as shown in FIG. 4 was filled with 30 ml of ink, and was mounted on an ink-jet recording apparatus shown in FIG. 3. A predetermined test pattern was printed on printing paper sheets: Xerox 4024, and regenerated paper sheets: EW-500. The initial optical density (OD1) of the print was measured, and the sharpness of the edge of the printed dot was evaluated organoleptically by optical microscopy. Then the printed matter was immersed in city water in a vat for 5 seconds, and dried naturally. Thereafter, the optical density (OD2) was again measured for evaluation of water resistance. The results are shown in Table 1.

TABLE 1

| Ink | Paper | OD1 | Organo-leptic evaluation | OD2 |
|---|---|---|---|---|
| Example 5 | Xerox | 1.32 | Good | 1.25 |
|  | EW-500 | 1.38 | Good | 1.32 |
| Example 6 | Xerox | 1.30 | Good | 1.20 |
|  | EW-500 | 1.32 | Good | 1.25 |
| Example 7 | Xerox | 1.28 | Good | 1.27 |
|  | Ew-500 | 1.31 | Good | 1.29 |
| Example 8 | Xerox | 1.31 | Good | 1.26 |
|  | EW-500 | 1.32 | Good | 1.30 |
| Example 9 | Xerox | 1.30 | Good | 1.28 |
|  | EW-500 | 1.32 | Good | 1.30 |
| Reference Example 1 | Xerox | 1.32 | Good | 0.90 |
|  | EW-500 | 1.35 | Good | 0.92 |
| Reference Example 2 | Xerox | 1.31 | Good | 0.85 |
|  | EW-500 | 1.32 | Good | 0.87 |

As shown in Table 1, the ink of the present invention has satisfactory properties for recording with sufficient optical density and excellent edge sharpness, and has much higher water fastness than conventional ink owing to the result of coordination bonding of a biodegradable polymer to a dye molecule.

As described above, the present invention provides an ink which is excellent in recording suitability, especially in water fastness. Then also is satisfactory in environmental protection such in that the ink is degraded and decolored into safe substances by microbial degradation even if the ink is discharged to the natural environment, in order to avoid coloration of the environment. The present invention also provides an ink-jet recording method, and an ink-jet recording apparatus.

What is claimed is:

1. An ink-jet recording apparatus comprising a waste-ink absorbent, wherein said absorbent is comprised of a composition containing a biodegradable polymer and a microorganism growth nutrient, and a container, made of a material containing an antimicrobial agent, housing said absorbent.

2. The ink-jet recording apparatus according to claim 1, further comprising a head for ejecting ink droplets by the action of thermal energy.

3. The ink-jet recording apparatus according to claim 1, wherein the biodegradable polymer is a biodegradable synthetic polymer.

4. The ink-jet recording apparatus according to claim 1, wherein the biodegradable polymer is a biodegradable synthetic polymer selected from the group consisting of starch-compounded synthetic polymers, modified starch-compounded synthetic polymers, micronized-cellulose-compounded synthetic polymers, and microorganism-produced synthetic polymers, or a mixture thereof.

5. The ink-jet recording apparatus according to claim 1, wherein the microorganism growth nutrient is a powdery solid foodstuff, powdery starch, or powdery sugar.

6. The ink-jet recording apparatus according to claim 1, wherein the microorganism growth nutrient is a powdery solid foodstuff which stuff selected from the group consisting of powdery solid soup, dried rice and wheat.

7. The ink-jet recording apparatus according to claim 1, wherein the waste-ink absorbent is housed in an ink cartridge which contains an ink container holding an ink.

8. The ink-jet recording apparatus according to claim 7, wherein the ink cartridge is made of a material containing an antimicrobial agent.

9. An ink cartridge comprising a container equipped with an ink container holding an ink and a waste-ink absorbent for absorbing a waste ink, wherein the waste-ink absorbent is composed of a composition containing a biodegradable polymer and a microorganism growth nutrient, and the container is made of a material containing an antimicrobial agent.

10. The ink cartridge according to claim 9, wherein the biodegradable polymer is a biodegradable synthetic polymer.

11. The ink cartridge according to claim 9, wherein the biodegradable polymer is a biodegradable synthetic polymer selected from the group consisting of starch-compounded synthetic polymers, modified starch-compounded synthetic polymers, micronized cellulose-compounded synthetic polymers, and microorganism-produced synthetic polymers, or a mixture thereof.

12. The ink cartridge according to claim 9, wherein the microorganism growth nutrient is a powdery solid foodstuff, powdery starch, or powdery sugar.

13. The ink cartridge according to claim 9, wherein the microorganism growth nutrient is a powdery solid foodstuff which is selected from the group consisting of powdery solid soup, dried rice and wheat.

* * * * *

UNITED STATES PATENT AND TRADEMARK OFFICE
CERTIFICATE OF CORRECTION

PATENT NO. : 5,579,038
DATED : November 26, 1996
INVENTOR(S) : Isao Kimura

It is certified that error appears in the above-indentified patent and that said Letters Patent is hereby corrected as shown below:

COLUMN 1
Line 64, "have" should read --has--.

COLUMN 2
Line 28, "ink-Jet" should read --ink-jet--.

COLUMN 3
Line 2, "ink-Jet" should read --ink-jet--.

Line 21, "ink-Jet" should read --ink-jet--.

COLUMN 5
Line 48, "A" should read --¶ A--.

COLUMN 6
Line 28, "The" should read --¶ The--.

COLUMN 7
Line 64, "Group" should read --group--.

COLUMN 8
Line 8, "No. 7" should read --No. 1--.

Line 55, "No. 5" should read --No. 6--.

UNITED STATES PATENT AND TRADEMARK OFFICE
CERTIFICATE OF CORRECTION

PATENT NO. : 5,579,038
DATED : November 26, 1996
INVENTOR(S) : Isao Kimura

It is certified that error appears in the above-indentified patent and that said Letters Patent is hereby corrected as shown below:

COLUMN 9
Line 2, "to" should read --polymer to--.

Line 17, "1,2,6-hexanetrial," should read --1,2,6-hexanetriol,--.

COLUMN 14
Line 12, "stuff" should read --is--.

Signed and Sealed this

First Day of July, 1997

Attest:

BRUCE LEHMAN

Attesting Officer

Commissioner of Patents and Trademarks